(12) United States Patent
Adams et al.

(10) Patent No.: US 11,867,961 B2
(45) Date of Patent: Jan. 9, 2024

(54) AVERSIVE CABLE WITH SACRIFICIAL LOBES

(71) Applicant: CORNING RESEARCH & DEVELOPMENT CORPORATION, Corning, NY (US)

(72) Inventors: Scott M. Adams, Newton, NC (US); William Welch McCollough, Cramerton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 168 days.

(21) Appl. No.: 17/480,530

(22) Filed: Sep. 21, 2021

(65) Prior Publication Data

US 2022/0003951 A1 Jan. 6, 2022

Related U.S. Application Data

(63) Continuation of application No. PCT/US2020/020610, filed on Mar. 2, 2020.

(60) Provisional application No. 62/824,594, filed on Mar. 27, 2019.

(51) Int. Cl.
*G02B 6/44* (2006.01)

(52) U.S. Cl.
CPC .......... *G02B 6/443* (2013.01); *G02B 6/4429* (2013.01)

(58) Field of Classification Search
CPC ....... H01B 7/184; G02B 6/4429; G02B 6/443
See application file for complete search history.

(56) References Cited

U.S. PATENT DOCUMENTS

| 4,309,072 | A | * | 1/1982 | Tweeddale | G02B 6/443 174/136 |
| 6,226,933 | B1 | * | 5/2001 | Nelson | E04H 12/20 43/124 |
| 6,468,554 | B1 | * | 10/2002 | Ichino | A01N 37/44 514/555 |
| 2007/0031096 | A1 | | 2/2007 | Moorjani et al. | |

(Continued)

FOREIGN PATENT DOCUMENTS

| CN | 105424882 A | | 3/2016 | |
| CN | 107221380 A | * | 9/2017 | ............. H01B 3/441 |

(Continued)

OTHER PUBLICATIONS

CN 107993762 A English translation (Year: 2017).*

(Continued)

*Primary Examiner* — Charlie Y Peng
(74) *Attorney, Agent, or Firm* — Thomas R. Irwin

(57) ABSTRACT

Provided herein are embodiments of an aversive cable. The cable includes a cable core comprising a longitudinal axis, a cable jacket surrounding the cable core along the longitudinal axis, and at least one sacrificial lobe. The cable jacket has an outer surface, and each of the at least one sacrificial lobe extends longitudinally along at least a portion of cable jacket and radially outward from the outer surface of the cable jacket. The cable jacket and the at least one sacrificial lobe include an aversive material. In embodiments, the sacrificial lobes are included on a cable sheath instead of the cable jacket, and the cable sheath surrounds the cable jacket without being bonded to the cable jacket.

19 Claims, 5 Drawing Sheets

(56) References Cited

U.S. PATENT DOCUMENTS

2015/0043874 A1* 2/2015 Sandate Aguilar .. G02B 6/4488
385/100
2015/0378119 A1 12/2015 Granger et al.

FOREIGN PATENT DOCUMENTS

| CN | 107938736 A | | 4/2018 |
|---|---|---|---|
| CN | 107993762 A | * | 5/2018 |
| CN | 108364720 A | | 8/2018 |
| CN | 207704916 U | | 8/2018 |
| CN | 208488579 U | | 2/2019 |
| WO | 2018/102330 A1 | | 6/2018 |
| WO | 2018/128230 A1 | | 7/2018 |

OTHER PUBLICATIONS

International Search Report and Written Opinion of the International Searching Authority; PCT/US2020/020610; dated Jun. 8, 2020; 11 pages; European Patent Office.

* cited by examiner

AVERSIVE CABLE WITH SACRIFICIAL LOBES

CROSS-REFERENCED TO RELATED APPLICATIONS

This application is a continuation of International Application No. PCT/US2020/020610 filed on Mar. 2, 2020, which claims the benefit of priority to U.S. Provisional Application No. 62/824,594 filed on Mar. 27, 2019, the content of each of which is relied upon and incorporated herein by reference in their entirety.

BACKGROUND

The disclosure relates generally to cables and more particularly to a cable having a rodent aversive feature formed as part of the cable jacket. Cables, such as power transmission cables, telephone cables, optical fiber cable, etc., are used to transmit electricity and/or data over distance. In order to do so, the cables have to be strung across land and/or buried in the ground between electricity/data sources and delivery points. Rodents have been known to chew on cables, which damages the cables and which can cause cable failure. Indeed, some estimates attribute approximately 5% of damage to aerial cables to squirrels alone. Other polymer articles are also subject to rodent chewing damage.

SUMMARY

In one aspect, embodiments of the present disclosure relate to an aversive cable. The cable includes a cable core comprising a longitudinal axis, a cable jacket surrounding the cable core along the longitudinal axis, and at least one sacrificial lobe. The cable jacket has an outer surface, and each of the at least one sacrificial lobe extends longitudinally along at least a portion of cable jacket and radially outward from the outer surface of the cable jacket. The cable jacket and the at least one sacrificial lobe include an aversive material.

In another aspect, embodiments of the present disclosure relate to an aversive cable. The aversive cable includes a cable core comprising a longitudinal axis, a cable jacket surrounding the cable core along the longitudinal axis, a cable sheath surrounding at least a first portion of the cable jacket along the longitudinal axis, and at least one sacrificial lobe. The cable jacket has an outer jacket surface. The cable sheath includes an inner sheath surface and an outer sheath surface, and the inner sheath surface faces the outer jacket surface. Each of the at least one sacrificial lobe extends longitudinally along at least a second portion of cable sheath and radially outward from the outer sheath surface. The cable sheath and the at least one sacrificial lobe include an aversive material.

In still another aspect, embodiments of the present disclosure relate to a method of preparing an aversive cable. In the method, a cable core is provided. The cable core has a longitudinal axis. A cable jacket is extruded around the cable core along the longitudinal axis of the cable core, and at least one sacrificial lobe is extruded along the longitudinal axis of the cable core and around the cable jacket. The at least one sacrificial lobe includes an aversive material.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
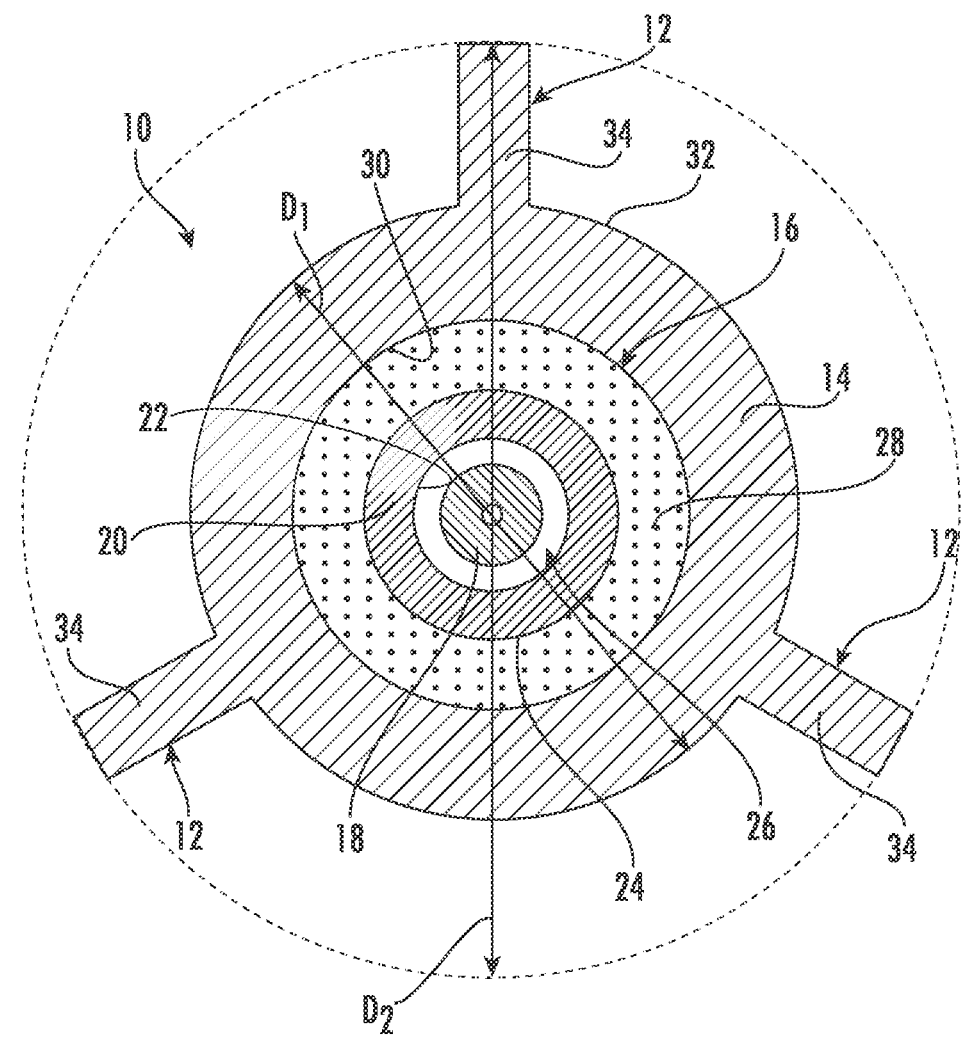
FIG. 1 depicts a longitudinal cross-sectional view of a cable having sacrificial lobes in the form of rectangular bosses, according to an exemplary embodiment.

Referring generally to the figures, various embodiments of a cable having sacrificial lobes containing an aversive additive for repelling rodents, birds, insects, monkeys, and other animals from structures made from or including polymers are provided. In many outdoor environments, animals tend to chew, gnaw, climb, or otherwise interact with man-made structures, such as electrical or telecommunication cables, which can cause these structures to prematurely fail, degrade, or be rendered unsuitable for their intended purpose. Aversive materials are used to repel animals before the animals have a chance to injure themselves or to cause damage to the structure. Aversive materials come in a variety of forms, such as chemicals that induce a negative sensory reaction or fear (e.g., of a nearby predator), glass fibers, metal wires, etc. However, in certain circumstances, the animal may destroy or damage the cable before the aversive additive can take effect. Indeed, for some thinner diameter cables, an animal may be able to sever the cable (or at least the cable jacket) in a single bite. At that point, the aversive additive may dissuade the animal from doing further damage, but significant damage has already been done to the cable. Prior attempts to address this problem typically involved including a metallic armor layer around the cable core, but such metallic layers can add to the cost of the cable, increase the size and weight, and decrease the flexibility of the cable. Other attempts to address this problem also involve including an aversive chemical or element in a layer inside the cable jacket or within the cable jacket layer; however, by the time the animal reaches the aversive material, the cable is opened up to exposure to the environment.

Embodiments of the present disclosure provide sacrificial lobes on which an animal may gnaw, chew, or bite without doing damage to the cable, which Applicant has found to address one or more of the foregoing deficiencies that Applicant has identified with current cables. As will be discussed below, the sacrificial lobes extend from the outer surface of the cable and contain an aversive material. Because the sacrificial lobes extend away from the outer surface of the cable, an animal will likely encounter a sacrificial lobe first and gnaw or bite on it instead of the cable. In this way, the animal is likely to encounter the aversive material before beginning to gnaw on the main cable body or other important cable structures. In this manner, the aversive material has a chance to repel the animal, and any damage done to the sacrificial lobes does not affect the structural integrity of the cable. Advantageously, it at least some embodiments, metallic armor layers can be avoided, and the aversive material can be accessed by an animal without having to allow access to the interior of the cable.

Exemplary embodiments of the present invention, including the use of the sacrificial lobes as part of an electrical or telecommunications cable, are provided by way of illustration and not by way of limitation. A person of ordinary skill in the art, upon consideration of the present disclosure, may recognize that the sacrificial lobes can be formed, applied, and/or used in different contexts beyond those discussed herein without departing from the spirit or scope of the present disclosure.

FIG. 1 depicts an exemplary embodiment of an aversive cable 10 including sacrificial lobes 12. The aversive cable 10 includes a cable jacket 14 that surrounds a cable core 16. In the embodiment depicted, the cable core 16 is an optical fiber cable core, specifically for an optical fiber drop cable. In other embodiments, the cable core 16 can be for a high or low voltage electrical power cable or a communication cable (e.g., twisted pair cable, coaxial cable, microwave guide cable, etc.). Returning to the embodiment depicted, the optical fiber cable core 16 includes an optical fiber 18 disposed within a buffer tube 20 in a loose tube configuration. More specifically, the buffer tube 20 has an inner surface 22 and an outer surface 24. The inner surface 22 defines a central bore 26 that carries the optical fiber 18. The central bore 26 may also include water-blocking gel disposed between the optical fiber 18 and the inner surface 22 of the buffer tube 20. Further, while a single optical fiber 18 is depicted, the buffer tube 20 could include a plurality of optical fibers 18 (e.g., from 2 to 200 optical fibers 18, or more).

As depicted in FIG. 1, the optical fiber cable core 12 further includes a layer of tensile elements 28 disposed on the outer surface 24 of the buffer tube 20. The tensile elements may be yarns, ribbons, or fibers wrapped around the buffer tube 20. For example, the tensile elements may be yarns made of, e.g., aramid, polyester, polyamide, polyolefin, carbon fiber, and/or glass fiber. The outer surface 24 of the buffer tube 20 may also be wrapped with a water blocking tape, or water-absorbent powder may be applied to the outer surface 24 of the buffer tube 20 or to the tensile elements 28.

The cable jacket 14 is disposed around the tensile elements 28. In particular, the cable jacket 14 has an inner surface 30 and an outer surface 32. The tensile elements 28 are disposed on the inner surface 30 of the cable jacket 14, and the outer surface 32 of the cable jacket 14 defines the outermost surface of the aversive cable 10. In this way, the cable jacket 14 is exposed to the environment, including to animals that might gnaw on the cable.

To address this potential issue of gnawing or biting by animals, the cable jacket 14 includes sacrificial lobes 12 projecting from the outer surface 32 of the cable jacket 14. As depicted in FIG. 1, the sacrificial lobes 12 are rectangular bosses 34. Because the sacrificial lobes 12 extend outwardly, the sacrificial lobes 12 will likely be the first part of the cable 10 with which an animal interacts. In this way, the animal will attack the sacrificial lobes 12 instead of the cable 10, thereby limiting or preventing damage through the thickness of the cable jacket 14 and into the cable core 16.

In embodiments, the outer surface 32 of the cable jacket 14 defines a first diameter $D_1$, and the furthest radial surface of the sacrificial lobes 12 defines a circle having a second diameter $D_2$ that is greater than first diameter $D_1$. In embodiments, the relationship between $D_1$ and $D_2$ is $1.1D_1 \leq D_2 \leq 3D_2$. In other embodiments, the relationship between $D_1$ and $D_2$ is $1.2D_1 \leq D_2 \leq 2D_2$. In still other embodiments, the relationship between $D_1$ and $D_2$ is $1.3D_1 \leq D_2 \leq 1.7D_2$. However, in general, the length of each sacrificial lobe 12 may be dictated by the size of the cable, the installation conditions, and/or the animal being repelled, among other possible factors. These diameters may apply as well to other embodiments described and depicted in the figures below.

In embodiments, the sacrificial lobes 12 contain an aversive material. Generally, the aversive material will trigger a flavor, olfactory, or tactile response in the animal, repelling the animal from, e.g., chewing, pecking, or climbing on the structure containing the aversive material. Examples of suitable aversive materials include cinnamaldehyde, wintergreen oil, natural or synthetic pepper or pepper extracts (such as capsaicin), peppermint oil, bergamot oil, geranium oil, predator urine, eucalyptus, bitterants (e.g., denatonium), pinene, lemon citrus oil, cedarwood oil, garlic oil, and any other aversive materials known in the art to produce an aversive reaction to an animal or animals in any or all environments. In embodiments, the aversive material is encapsulated to extend the service life. In an embodiment, the encapsulant is an evacuated cell of a micro-organism, such a yeast cell, which is infused with the aversive material, and coated with a shell layer to keep the aversive material within the encapsulant. Such encapsulants have a diameter (i.e., maximum cross-sectional dimension) of from 1 μm to 20 μm.

For the cable 10, the aversive material may be compounded with the material selected for the cable jacket 14. Examples of suitable polymers for the cable jacket 14 include thermoplastic polymers, thermoset polymers, elastomers, ionomers, and thermoplastic elastomers. Exemplary polymers include ethylene-vinyl acetate copolymers, ethylene-acrylate copolymers, polyethylene homopolymers (low, medium, and high density), linear low density polyethylene, very low density polyethylene, polypropylene homopolymer, polyolefin elastomer copolymer, polyethylene-polypropylene copolymer, butene- and octane-branched copolymers, or maleic anhydride-grafted versions of the polymers listed above. In another embodiment, exemplary polymers include halogenated thermoplastics (such as polyvinyl chloride); fluoropolymers; polyamide 6, 6/6, 11, or 12 resins; thermoplastic polyurethane; or a crosslinked polyethylene.

In embodiments, the aversive material is mixed with other optional polymer additives prior to or during compounding. Typical polymer additives include pigments, stabilizers, fungicides, and fillers (such as zeolite, clay, talc, etc.). In embodiments, the aversive additive (e.g., chemical or encapsulated chemical) comprises between 0.01% and 30% by weight of the polymer composition. In certain embodiments, the aversive additive other polymer additives together comprise from 2% to 50% by weight of the polymer composition.

In embodiments, the polymer containing the aversive additive can be extruded as the cable jacket 14 of the aversive cable 10. In particular, the cable jacket 14, including the sacrificial lobes 12, is extruded around the cable core 16 to form the aversive cable 10. In this way, the material of the cable jacket 14 is continuous and integral with the material of the sacrificial lobes 12.

In the embodiment depicted, the aversive cable 10 includes three sacrificial lobes 12 that are equidistantly spaced around the outer surface 32 of the cable jacket 14. Three, equidistantly-spaced sacrificial lobes 12 helps to ensure that an animal that encounters the aversive cable 10 will first encounter one of the sacrificial lobes 12. However, in other embodiments, the number of sacrificial lobes 12 may be less than three (such as one or two sacrificial lobes 12) or more than three (such as four to twelve sacrificial lobes 12). Further, in embodiments, the sacrificial lobes 12 may not be equidistantly-spaced around the outer surface 32 of the cable jacket 14. That is, the spacing between a first pair of adjacent sacrificial lobes 12 may be different from the spacing between any other pair of adjacent sacrificial lobes 12. Additionally, while the sacrificial lobes 12 depicted in FIG. 1 are rectangular bosses 34, other shapes may also be utilized.

Figure 2:
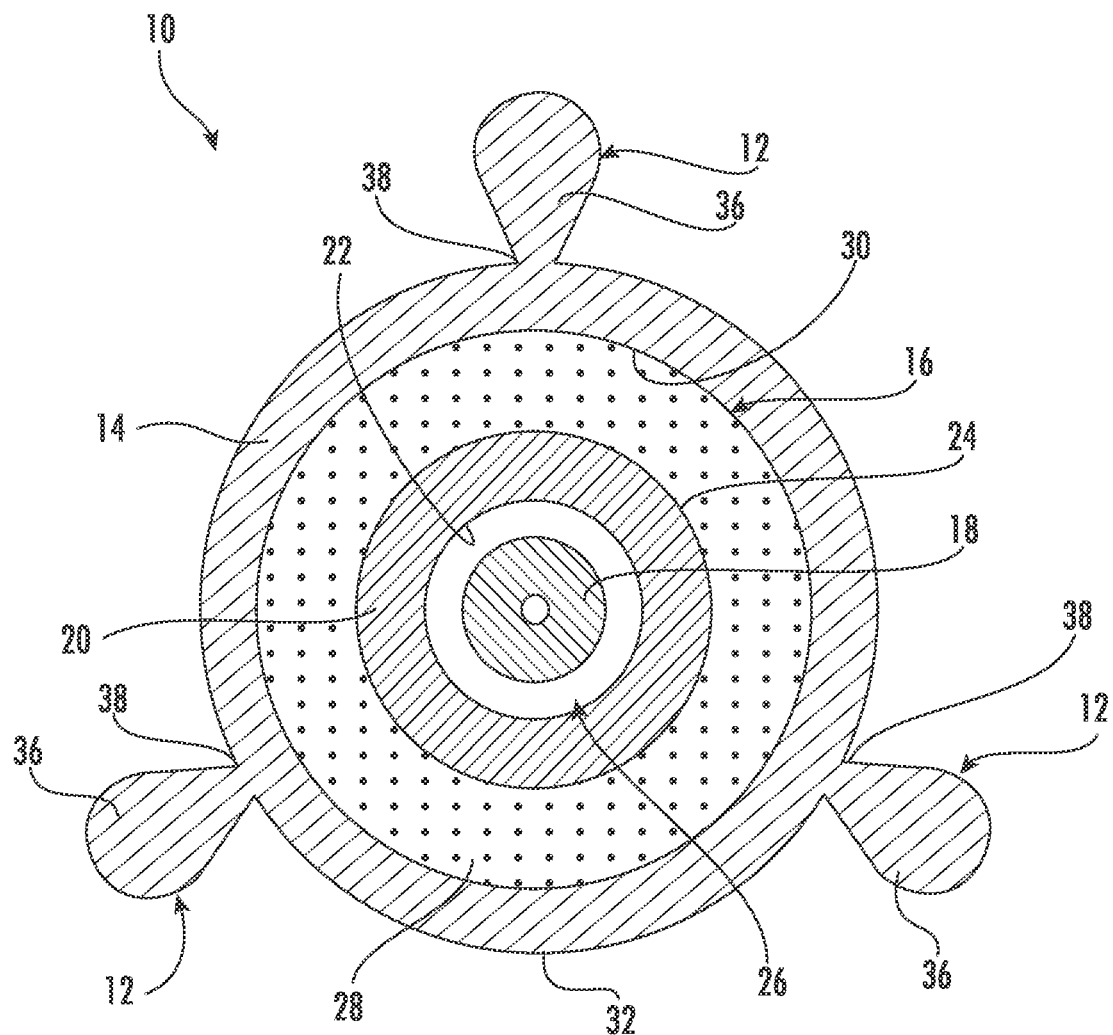
FIG. 2 depicts a longitudinal cross-sectional view of a cable having sacrificial lobes with teardrop-shapes, according to an exemplary embodiment.

For example, as shown in FIG. 2, the sacrificial lobes 12 may be lobes with a rounded surface, such as lobes shaped as teardrops 36. The teardrops 36 have a length dimension in the radial direction of the cable 10 and a variable width dimension that is perpendicular to the length dimension. The width dimension increases going radially outward along the length dimension until a maximum is reached, and from this maximum, the width dimension decreases until the end of the teardrop 36 is reached. In another embodiment, the teardrops 36 may be described as having a cross-section with a surface defining an outer radial arc in which the ends of the arc are connected to the cable jacket 14 by substantially planar surfaces that taper towards one another until each surface reaches the cable jacket 14. The teardrops 36 are attached to the cable jacket 14 by a thin web 38. By attaching the sacrificial lobes 12 with a thin web 38, a cable installer can tear away a portion of the sacrificial lobes 12 so that the cable 10 has the same cable diameter and geometry as a non-aversive cable, which facilitates usage of the aversive cable 10 with existing, industry standard connector fittings.

Besides the rectangular bosses 34 of FIG. 1 and the teardrops 36 of FIG. 2, the sacrificial lobes 12 can be a variety of other shapes, including triangles (with the base being proximal or distal from the outer surface 32), rounded or elliptical lobes, waves, curls/spirals, trapezoidal, etc.

Figure 3:
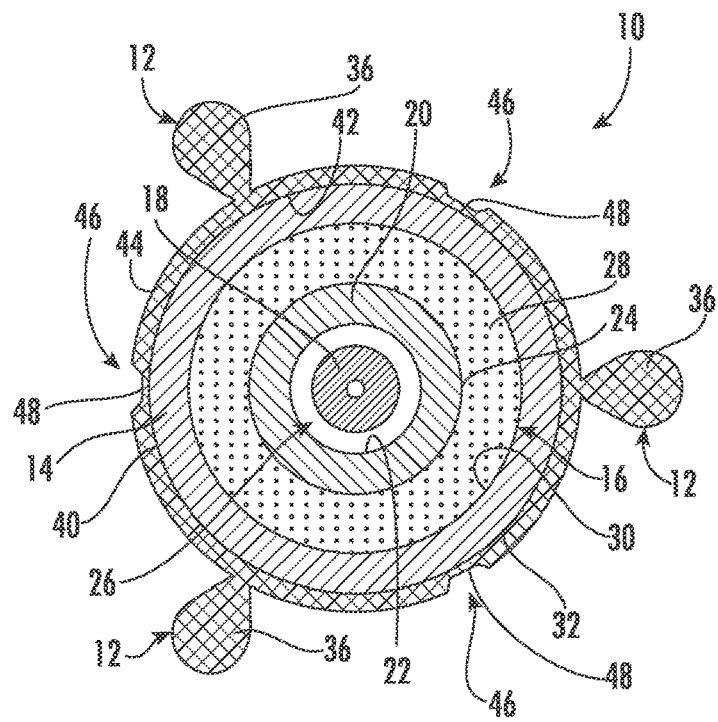
FIG. 3 depicts a longitudinal cross-sectional view of an outer sheath formed around a cable in which the outer sheath includes sacrificial lobes, according to an exemplary embodiment.

In another embodiment shown in FIG. 3, the sacrificial lobes 12 are contained on a detachable cable sheath 40. In such embodiments, the cable sheath 40 is extruded around the cable jacket 14. In particular, the cable sheath 40 has an inner surface 42 and an outer surface 44, and the inner surface 42 of the cable sheath 40 faces the outer surface 32 of the cable jacket 14. In embodiments, the inner surface 42 of the cable sheath 40 is in contact with but not bonded to the outer surface 32 of the cable jacket 14. In other embodiments, a release layer is disposed between the inner surface 42 of the cable sheath 40 and the outer surface 32 of the cable jacket. In embodiments in which the cable sheath 40 is used, the outer surface 44 of the cable sheath 40 is the outermost surface of the aversive cable 10.

Figure 4:
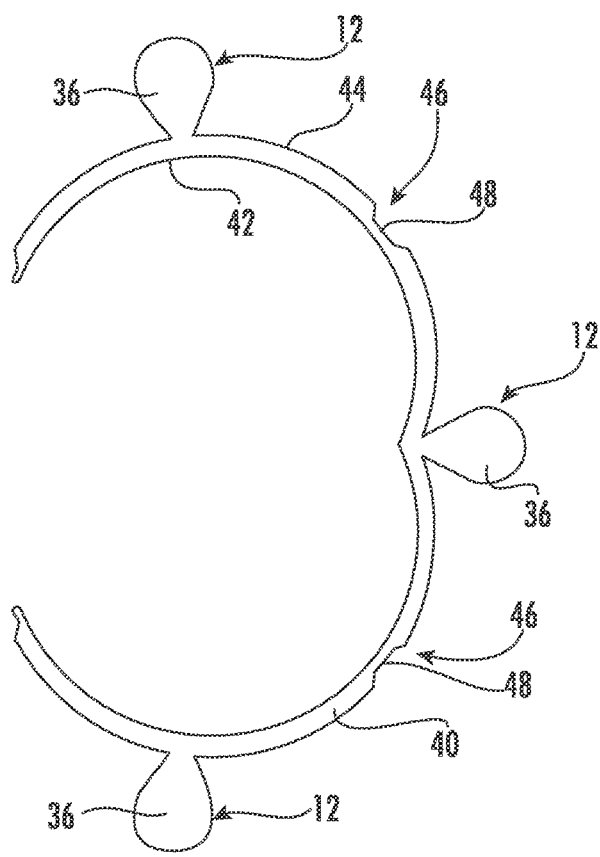
FIG. 4 depicts the outer sheath of FIG. 3 as removed from the cable, according to an exemplary embodiment.

As shown in the embodiment depicted in FIG. 3, the cable sheath 40 includes at least one preferential tearing region 46. The preferential tearing region 46 facilitates tearing of the cable sheath 40 at predefined locations to better control removal of the cable sheath 40 either by an attacking animal or by a cable installer. In the embodiment depicted, the cable sheath 40 includes three preferential tearing regions 46 that are thin sections 48 of the cable sheath 40. In other embodiments, perforations may also be used as the preferential tearing regions 40. FIG. 4 depicts the cable sheath 40 detached from the aversive cable 10. As can be seen in FIG. 4, the cable sheath 40 was torn at a preferential tearing region 46, and because the cable sheath 40 is not bonded to the cable jacket 14, the cable sheath 40 releases from the cable jacket 14.

In embodiments, the cable sheath 40 is extruded around the cable jacket 14 of the aversive cable 10. In particular, the cable sheath 40, including the sacrificial lobes 12, is extruded around the cable jacket 14 to form the aversive cable 10. In this way, the material of the cable sheath 40 is continuous and integral with the material of the sacrificial lobes 12.

Figure 5:
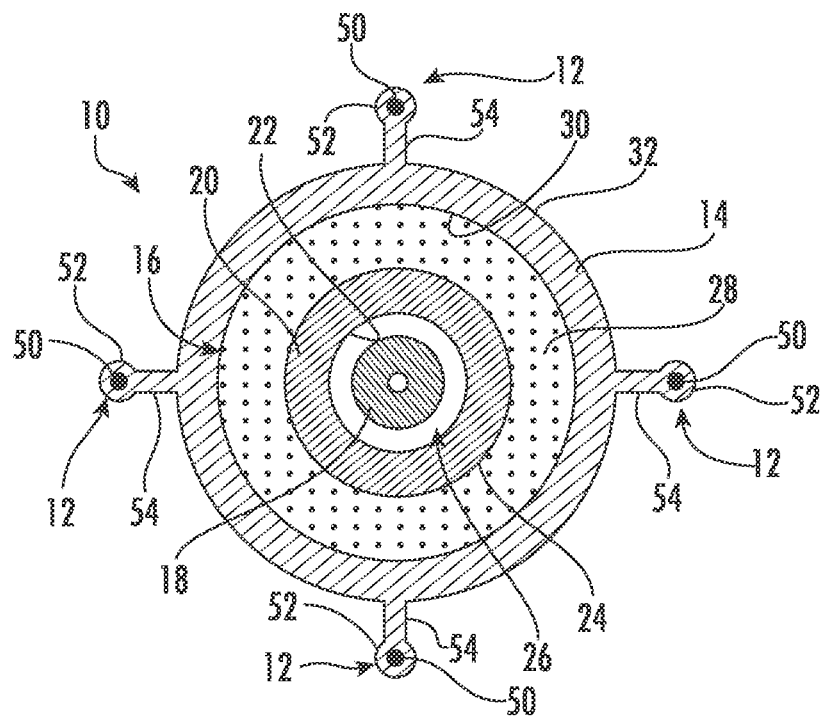
FIG. 5 depicts a longitudinal cross-sectional view of a cable having sacrificial lobes encapsulating aversive cords, according to an exemplary embodiment.
Figure 6:
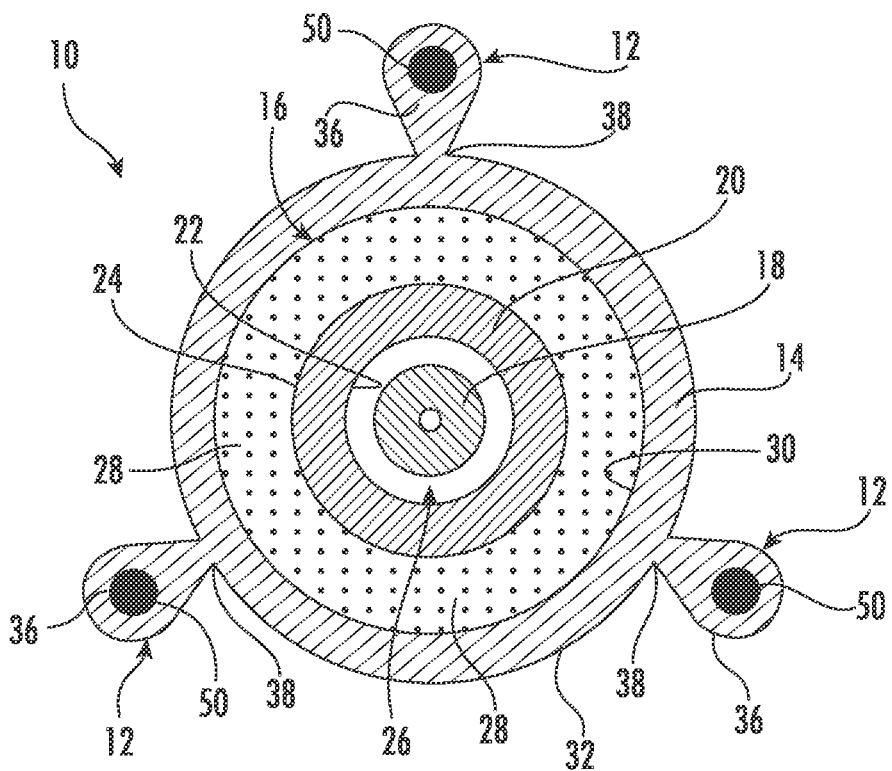
FIG. 6 depicts a longitudinal cross-sectional view of a cable having teardrop-shaped sacrificial lobes with embedded aversive cords, according to an exemplary embodiment.

FIG. 5 depicts another embodiment of an aversive cable 10 in which the sacrificial lobes 12 encapsulate a cord 50 impregnated with aversive material. As can be seen, the sacrificial lobes 12 have a round portion 52 that surrounds the cord 50 and a web portion 54 that attaches the round portion 52 to the cable jacket 14. In such an embodiment, the material comprising the cable jacket 14 does not include an aversive material. Further, as shown in FIG. 5, there are four, equidistantly-spaced sacrificial lobes 12. Advantageously, this configuration of sacrificial lobes 12 creates a square or diamond shaped cross-section, which enhances tight winding on spools and reduces friction when the aversive cable 10 is pulled through ducts. Like FIG. 5, FIG. 6 also depicts an aversive cable 10 in which cords 50 impregnated with an aversive material are contained in the sacrificial lobes 12. In the embodiment of FIG. 6, though, the sacrificial lobes 14 are teardrops 36, and there are three sacrificial lobes 12 instead of four.

Figure 7:
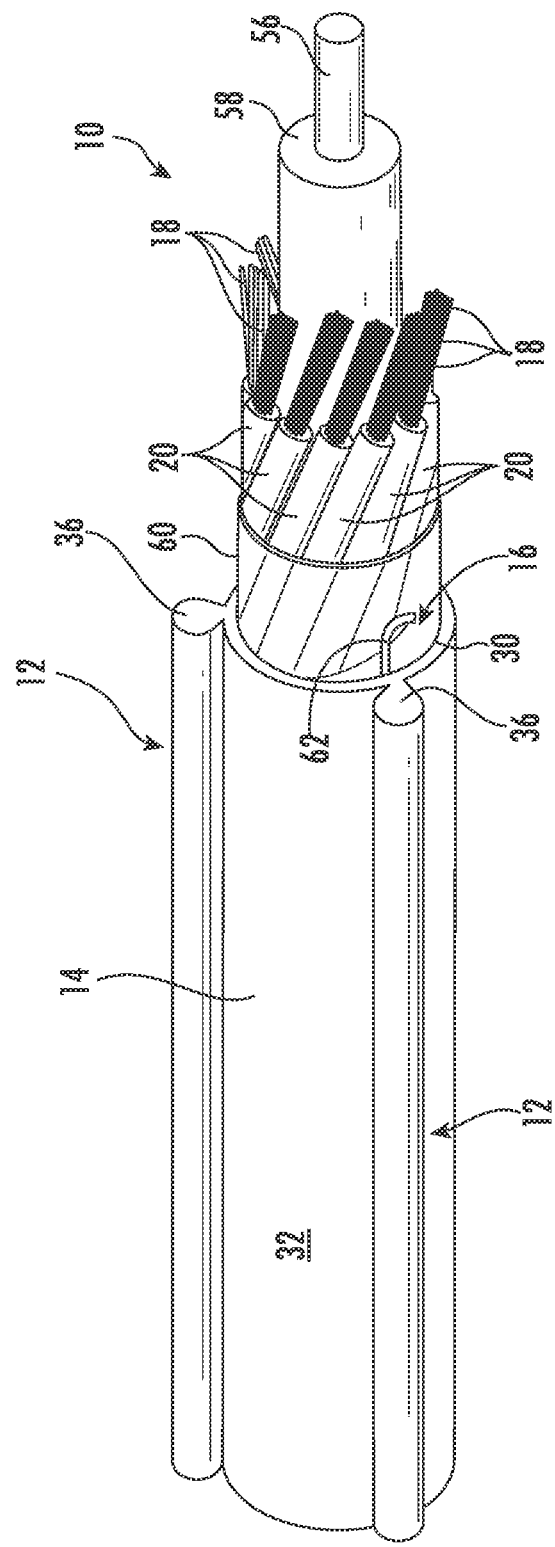
FIG. 7 is a view of an aversive cable depicting the sacrificial lobes extending along a longitudinal axis of the aversive cable, according to an exemplary embodiment.

FIG. 7 depicts another embodiment of an aversive cable 10 in which the aversive cable is an optical fiber distribution cable. This embodiment of the aversive cable 10 includes many of the same elements of the drop cable, including optical fibers 18 disposed within a buffer tube 20 in which the buffer tube 20 is surrounded by a cable jacket 14. However, as can be seen in FIG. 7, there are multiple buffer tubes 20 that each contain several optical fibers 18. The buffer tubes 20 are stranded around a central strength member 56 with an upjacket 58. Further, the buffer tubes 20 are wrapped with a water blocking tape 60. The cable jacket 14 surrounds the water blocking taper 60. Thus, in the embodiment depicted in FIG. 7, the cable core 16 comprises all of the elements inside the cable jacket 14, including the water blocking tape 60, the buffer tubes 20, the optical fibers 18, the central strength member 56, and the upjacket 58. Further, in the embodiment depicted, the cable jacket 14 includes a ripcord 62 that provides access to the interior of the aversive cable 10.

Besides demonstrating that the foregoing description applies to more than just drop cables, FIG. 7 also demonstrates that the sacrificial lobes 12 extend along the longitudinal axis of the aversive cable 10. That is, the sacrificial lobes 12 have the length and width dimensions mentioned above as well as a longitudinal dimension. In embodiments, the sacrificial lobes 12 may be continuous along the longitudinal axis of the aversive cable 10 or discontinuous along the longitudinal axis of the aversive cable 10 (i.e., only in certain segments or intermittent along the aversive cable 10).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An aversive cable, comprising:
a cable core comprising a longitudinal axis;
a cable jacket comprising an outer surface, the cable jacket surrounding the cable core along the longitudinal axis;
at least one sacrificial lobe, each of the at least one sacrificial lobe extending longitudinally along at least a portion of cable jacket and radially outward from the outer surface of the cable jacket;
wherein the cable jacket and the at least one sacrificial lobe comprise an aversive material; and
wherein the cable jacket and each of the at least one sacrificial lobe are formed from a single integral and continuous polymer structure.

2. The aversive cable of claim 1, wherein the cable core is an optical fiber cable core comprising at least one optical fiber.

3. The aversive cable of claim 1, wherein the at least one sacrificial lobe comprises from one sacrificial lobe to eight sacrificial lobes.

4. The aversive cable of claim 1, wherein the at least one sacrificial lobe comprises at least two sacrificial lobes and wherein the at least two sacrificial lobes are equidistantly spaced around the cable jacket.

5. The aversive cable of claim 1, wherein the aversive material includes at least one of cinnamaldehyde, wintergreen oil, natural or synthetic pepper or pepper extract, capsaicin, peppermint oil, bergamot oil, geranium oil, predator urine, eucalyptus, bitterants, pinene, lemon citrus oil, cedarwood oil, or garlic oil.

6. An aversive cable, comprising:
a cable core comprising a longitudinal axis;
a cable jacket comprising an outer surface, the cable jacket surrounding the cable core along the longitudinal axis;
at least one sacrificial lobe, each of the at least one sacrificial lobe extending longitudinally along at least a portion of cable jacket and radially outward from the outer surface of the cable jacket;
wherein the cable jacket and the at least one sacrificial lobe comprise an aversive material; and
wherein each of the at least one sacrificial lobe comprises a rectangular boss.

7. An aversive cable, comprising:
a cable core comprising a longitudinal axis;
a cable jacket comprising an outer surface, the cable jacket surrounding the cable core along the longitudinal axis;
at least one sacrificial lobe, each of the at least one sacrificial lobe extending longitudinally along at least a portion of cable jacket and radially outward from the outer surface of the cable jacket;
wherein the cable jacket and the at least one sacrificial lobe comprise an aversive material; and
wherein each of the at least one sacrificial lobe comprises a longitudinal cross-sectional surface in the shape of a teardrop connected to the outer surface of the cable jacket with a web.

8. The aversive cable of claim 7, wherein each of the at least one sacrificial lobe encapsulates a cord impregnated with the aversive material.

9. An aversive cable, comprising:
a cable core comprising a longitudinal axis;
a cable jacket comprising an outer surface, the cable jacket surrounding the cable core along the longitudinal axis;
at least one sacrificial lobe, each of the at least one sacrificial lobe extending longitudinally along at least a portion of cable jacket and radially outward from the outer surface of the cable jacket;
wherein the cable jacket and the at least one sacrificial lobe comprise an aversive material; and
wherein each of the at least one sacrificial lobe comprises a round portion encapsulating a cord impregnated with the aversive material and wherein a web portion connects the round portion to the outer surface of the cable jacket.

10. An aversive cable, comprising:
a cable core comprising a longitudinal axis;
a cable jacket comprising an outer jacket surface, the cable jacket surrounding the cable core along the longitudinal axis;
a cable sheath comprising an inner sheath surface and an outer sheath surface, the cable sheath surrounding at least a first portion of the cable jacket along the longitudinal axis, wherein the inner sheath surface faces the outer jacket surface;
at least one sacrificial lobe, each of the at least one sacrificial lobe extending longitudinally along at least a second portion of cable sheath and radially outward from the outer sheath surface;
wherein the cable sheath and the at least one sacrificial lobe comprise an aversive material; and
wherein the cable sheath and the at least one sacrificial lobe are formed from a single integral and continuous polymer structure.

11. The aversive cable of claim 10, wherein the inner sheath surface is in contact with the outer jacket surface along at least a longitudinal portion of the aversive cable and wherein the inner sheath surface is not bonded to the outer jacket surface in the longitudinal portion.

12. The aversive cable of claim 10, wherein a release layer is disposed between the inner sheath surface and the outer jacket surface over at least a longitudinal portion of the aversive cable.

13. The aversive cable of claim 10, wherein the cable sheath comprises at least one preferential tear region.

14. The aversive cable of claim 13, wherein the cable sheath comprises a thickness between the inner sheath surface and the outer sheath surface and wherein, in each of the at least one preferential tear region, the thickness of the cable sheath is less the thickness outside of the at least one preferential tear region.

15. The aversive cable of claim 10, wherein the aversive material includes at least one of cinnamaldehyde, wintergreen oil, natural or synthetic pepper or pepper extract, capsaicin, peppermint oil, bergamot oil, geranium oil, predator urine, eucalyptus, bitterants, pinene, lemon citrus oil, cedarwood oil, or garlic oil.

16. An aversive cable, comprising:
    a cable core comprising a longitudinal axis;
    a cable jacket comprising an outer jacket surface, the cable jacket surrounding the cable core along the longitudinal axis;
    a cable sheath comprising an inner sheath surface and an outer sheath surface, the cable sheath surrounding at least a first portion of the cable jacket along the longitudinal axis, wherein the inner sheath surface faces the outer jacket surface;
    at least one sacrificial lobe, each of the at least one sacrificial lobe extending longitudinally along at least a second portion of cable sheath and radially outward from the outer sheath surface;
    wherein the cable sheath and the at least one sacrificial lobe comprise an aversive material; and
    wherein each of the at least one sacrificial lobe encapsulates a cord impregnated with the aversive material.

17. The aversive cable of claim 16, wherein a round portion encapsulates the cord impregnated with the aversive material and wherein a web portion connects the round portion to the outer surface of the cable jacket.

18. A method of preparing an aversive cable, comprising the steps of:
    providing a cable core comprising a longitudinal axis;
    extruding a cable jacket around the cable core along the longitudinal axis of the cable core; and
    extruding at least one sacrificial lobe along the longitudinal axis of the cable core and around the cable jacket, the at least one sacrificial lobe comprising an aversive material.

19. The method of claim 18, wherein the step of extruding the cable jacket occurs simultaneously with the step of extruding the at least one sacrificial lobe such that each of the at least one sacrificial lobe extends from an outer surface of the cable jacket.

* * * * *